C. LARSEN.
CLINOMETER.
APPLICATION FILED JULY 17, 1908.
918,869.
Patented Apr. 20, 1909.
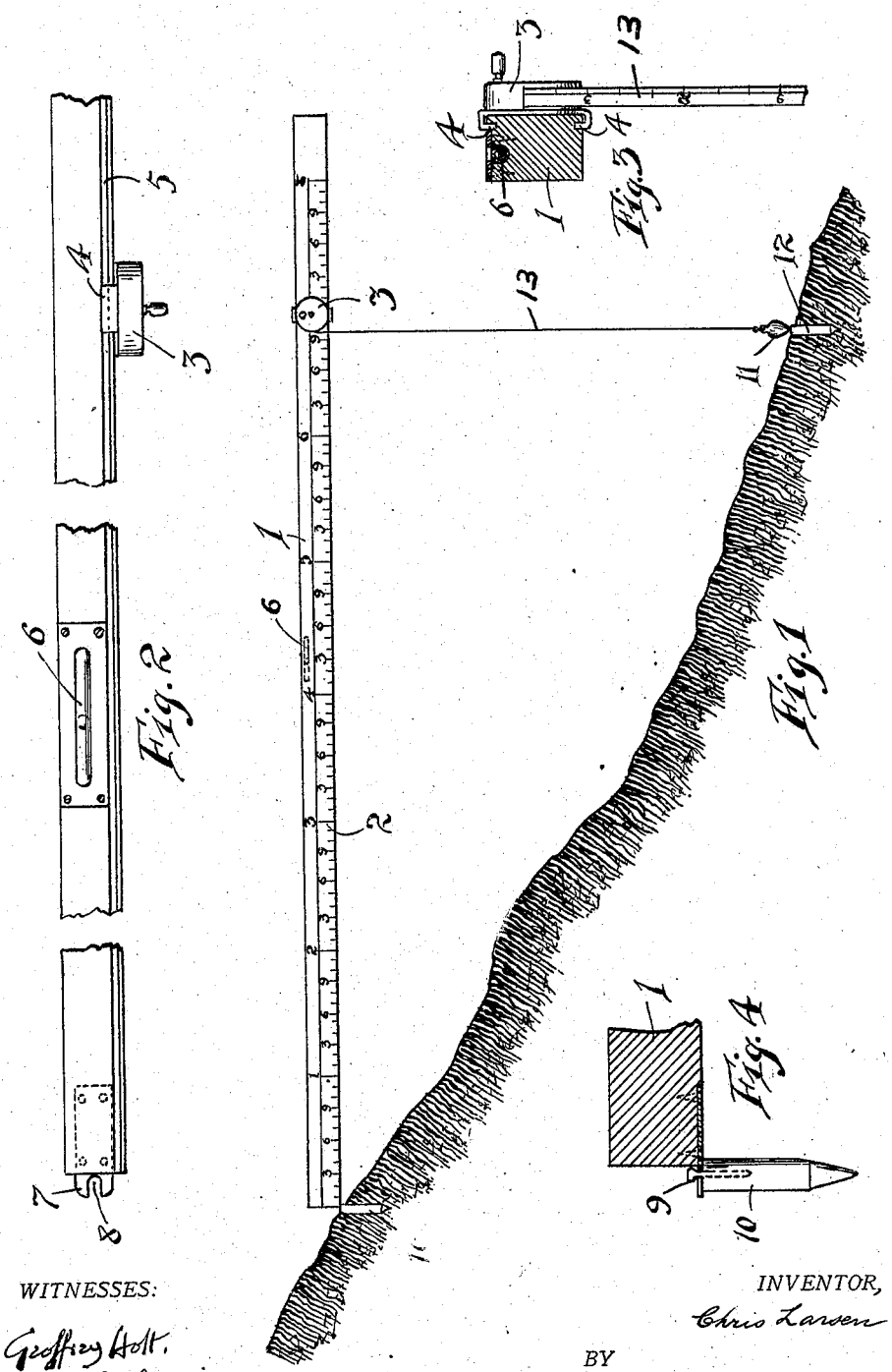

UNITED STATES PATENT OFFICE.

CHRIS LARSEN, OF SAN FRANCISCO, CALIFORNIA.

CLINOMETER.

No. 918,869.     Specification of Letters Patent.     Patented April 20, 1909.

Application filed July 17, 1908. Serial No. 444,136.

*To all whom it may concern:*

Be it known that I, CHRIS LARSEN, a citizen of the United States, residing at San Francisco, in the county of San Francisco, and State of California, have invented new and useful Improvements in Clinometers, of which the following is a specification.

The object of the present invention is to provide a simple and convenient form of clinometer for use in surveying and similar operations.

In the accompanying drawing, Figure 1 is a side view showing the apparatus in use; Fig. 2 is an enlarged broken plan view of the apparatus; Fig. 3 is a transverse section; Fig. 4 is a sectional view of one end thereof in position.

Referring to the drawing, 1 indicates a rod, a convenient length of which is about eight feet. It is suitably graduated as shown at 2, in feet and inches. Upon said rod is adjustably mounted a tape line holder 3, said holder having fingers 4, which move in grooves 5 in the top and bottom of the rod. In the upper surface of the rod, at about the middle, is mounted a level tube 6. To one end of said rod is secured a brass foot 7 formed with a slit 8 which is adapted to be passed around a nail, shown at 9, in the top of a peg or post 10, driven into the ground by the surveyor. To the outer end of the tape line 13 is secured a plumb bob 11, the point of which is arranged to touch the top of a second peg 12 driven into the ground.

The device is used in the following manner. The surveyor having driven in the pegs 10, 12, at the terminal portions of that part of the ground of which he desires to ascertain the level, places the slit 8 in the brass foot 7 around the nail 9 in the upper peg 10, and then holds the rod level, as indicated by the bubble level, while at the same time unwinding the tape line to lower the plumb bob, and moving the tape line casing along the rod, until the point of the plumb bob touches the lower peg. The readings upon the rod and tape line will then furnish the general inclination of the ground between the two pegs, suitable correction of the tape reading being made for the difference between the height of the plumb bob, and the distance of the lower edge of the rod from the opening in the tape casing. Thus, if, as shown in the drawing, the height of the lower edge of the rod above the top of the peg 12 is 2 feet 3 inches, and the distance of the tape from the peg 10 is 6 feet 10 inches, the angle which measures the general inclination of the ground is one whose tangent is the fraction $\frac{27}{82}$.

The device will be found useful not only for surveyors but for builders, contractors, and others, and for any operation in which it is desired to ascertain the inclination of a surface.

An advantageous feature of the invention consists in the fact that both parts of the apparatus, namely, the rod and the tape line, are frequently used in other operations connected with surveying. Therefore by the above invention I provide a clinometer without materially adding to the expense of purchasing and the trouble in transporting such instruments as are needed by the surveyor.

I claim:—

1. A clinometer comprising a graduated rod, a level therein, a tape line casing slidable thereon, a tape line in said casing and a plumb bob secured upon the end of the tape line, substantially as described.

2. A clinometer comprising a graduated rod, a level in the rod, said rod having a metal foot at its end slitted to surround a nail, a tape line casing slidable thereon, a tape line in said casing and a plumb bob secured upon the end of the tape line, substantially as described.

In testimony whereof I have hereunto set my hand in the presence of two subscribing witnesses.

CHRIS LARSEN.

Witnesses:
   FRANCIS M. WRIGHT,
   D. B. RICHARDS.